US010200839B2

(12) United States Patent
Wong et al.

(10) Patent No.: US 10,200,839 B2
(45) Date of Patent: Feb. 5, 2019

(54) METHOD AND APPARATUS FOR LOW COST MACHINE TYPE COMMUNICATION

(71) Applicant: Alcatel Lucent, Boulogne Billancourt (FR)

(72) Inventors: Shin Horng Wong, Chippenham (GB); Seau Sian Lim, Swindon (GB); Yu Chen, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 69 days.

(21) Appl. No.: 15/127,801

(22) PCT Filed: Mar. 21, 2014

(86) PCT No.: PCT/CN2014/073910
§ 371 (c)(1),
(2) Date: Sep. 21, 2016

(87) PCT Pub. No.: WO2015/139329
PCT Pub. Date: Sep. 24, 2015

(65) Prior Publication Data
US 2017/0134879 A1 May 11, 2017

(51) Int. Cl.
*H04W 4/70* (2018.01)
*H04W 24/10* (2009.01)
(Continued)

(52) U.S. Cl.
CPC ............. *H04W 4/70* (2018.02); *H04W 24/10* (2013.01); *H04W 28/0278* (2013.01);
(Continued)

(58) Field of Classification Search
CPC ... H04L 5/0048; H04L 5/0053; H04L 47/365; H04W 4/70; H04W 52/0225;
(Continued)

(56) References Cited

U.S. PATENT DOCUMENTS 7,257,423 B2 * 8/2007 Iochi ..................... H04L 1/0026
370/331
7,961,657 B2 * 6/2011 Cave ..................... H04L 1/1835
370/310
(Continued)

FOREIGN PATENT DOCUMENTS

CN 101114857 A 1/2008
CN 102083129 A 6/2011
(Continued)

OTHER PUBLICATIONS

Huawei et al., Tdoc: R2-140286, Introduction of Category 0 for low cost MTC, Feb. 14, 2014, 3GPP, 3GPP TSG-RAN WG2 #85 (Year: 2014).*

(Continued)

*Primary Examiner* — Eric Nowlin
(74) *Attorney, Agent, or Firm* — Fay Sharpe LLP

(57) ABSTRACT

Methods and apparatuses for use in a low cost machine type communication user equipment, wherein the low cost machine type communication user equipment communicates with a legacy base station, are provided. The method comprises adjusting at least one parameter relating to scheduling such that the legacy base station is to schedule the low cost machine type communication user equipment with a transmission block size less than a predefined size. The method also comprises reporting the adjusted at least one parameter to the legacy base station. With the methods and apparatuses of the present disclosure, it is possible for the low cost machine type communication use equipment to operate in the coverage area of the legacy base station.

13 Claims, 2 Drawing Sheets

(51) Int. Cl.
*H04W 28/02* (2009.01)
*H04W 28/18* (2009.01)
*H04W 52/36* (2009.01)
*H04W 72/12* (2009.01)

(52) U.S. Cl.
CPC ......... *H04W 52/365* (2013.01); *H04W 72/12* (2013.01); *H04W 72/1284* (2013.01); *H04W 28/18* (2013.01)

(58) Field of Classification Search
CPC . H04W 52/365; H04W 72/04; H04W 72/042; H04W 72/0446
See application file for complete search history.

(56) References Cited

U.S. PATENT DOCUMENTS

| | | | | |
|---|---|---|---|---|
| 8,238,302 B2* | 8/2012 | Ahn | | H04L 1/0028 370/329 |
| 8,340,019 B2* | 12/2012 | Takagi | | H04W 28/22 370/328 |
| 8,743,780 B2* | 6/2014 | Sangiamwong | | H04W 72/005 370/328 |
| 8,902,763 B2* | 12/2014 | DiGirolamo | | H04W 28/18 370/252 |
| 9,077,490 B2* | 7/2015 | Scholand | | H04L 1/0027 |
| 9,112,906 B2* | 8/2015 | Cheng | | H04W 28/0205 |
| 9,167,585 B2* | 10/2015 | Sayana | | H04W 72/048 |
| 9,179,409 B2* | 11/2015 | Gupta | | H04W 52/0219 |
| 9,237,469 B2* | 1/2016 | Di Girolamo | | H04W 28/18 |
| 9,319,203 B2* | 4/2016 | Yang | | H04L 1/1867 |
| 9,357,504 B2* | 5/2016 | Ohwatari | | H04W 52/143 |
| 9,374,178 B2* | 6/2016 | Rao | | H04B 17/309 |
| 9,426,787 B2* | 8/2016 | Zhou | | H04L 1/0026 |
| 9,474,030 B2* | 10/2016 | Simonsson | | H04W 52/36 |
| 9,590,935 B2* | 3/2017 | Huang | | H04L 51/12 |
| 9,661,492 B2* | 5/2017 | Yavuz | | H04W 8/24 |
| 9,807,771 B2* | 10/2017 | Whinnett | | H04W 72/0473 |
| 10,039,132 B2* | 7/2018 | Lee | | H04W 74/0833 |
| 2005/0208973 A1* | 9/2005 | Iochi | | H04L 1/0026 455/561 |
| 2007/0123290 A1* | 5/2007 | Stenmark | | H04W 52/288 455/522 |
| 2008/0137573 A1* | 6/2008 | Cave | | H04L 1/1835 370/310 |
| 2008/0225744 A1* | 9/2008 | DiGirolamo | | H04W 28/18 370/252 |
| 2009/0225699 A1* | 9/2009 | Takagi | | H04W 28/22 370/328 |
| 2010/0290412 A1* | 11/2010 | Ahn | | H04L 1/0028 370/329 |
| 2011/0085500 A1* | 4/2011 | Sangiamwong | | H04L 1/0027 370/328 |
| 2011/0103372 A1* | 5/2011 | Shatsky | | H04L 65/1016 370/352 |
| 2011/0205945 A1* | 8/2011 | Cave | | H04L 1/1835 370/310 |
| 2011/0264740 A1* | 10/2011 | Diachina | | H04W 4/005 709/204 |
| 2011/0280184 A1* | 11/2011 | Diachina | | H04W 76/12 370/328 |
| 2012/0207054 A1* | 8/2012 | Okubo | | H04L 1/0003 370/252 |
| 2012/0269143 A1 | 10/2012 | Bertrand | | |
| 2013/0044616 A1* | 2/2013 | Scholand | | H04L 1/0027 370/252 |
| 2013/0114395 A1* | 5/2013 | Cheng | | H04W 28/0205 370/216 |
| 2013/0242729 A1 | 9/2013 | Chen | | |
| 2013/0250886 A1* | 9/2013 | Zhou | | H04L 1/0026 370/329 |
| 2013/0308572 A1* | 11/2013 | Sayana | | H04W 72/048 370/329 |
| 2014/0105191 A1* | 4/2014 | Yang | | H04L 1/1867 370/336 |
| 2014/0153417 A1* | 6/2014 | Gupta | | H04W 52/0219 370/252 |
| 2014/0293811 A1* | 10/2014 | Rao | | H04W 52/262 370/252 |
| 2015/0049628 A1* | 2/2015 | Di Girolamo | | H04W 28/18 370/252 |
| 2015/0126238 A1* | 5/2015 | Simonsson | | H04W 52/36 455/522 |
| 2015/0146638 A1* | 5/2015 | Ohwatari | | H04W 52/143 370/329 |
| 2015/0215099 A1* | 7/2015 | Tie | | H04L 5/0057 370/329 |
| 2015/0281330 A1* | 10/2015 | Huang | | H04L 51/12 709/203 |
| 2016/0088503 A1* | 3/2016 | Cave | | H04W 28/18 370/252 |
| 2016/0094310 A1* | 3/2016 | Xia | | H04L 1/0003 370/329 |
| 2016/0135210 A1* | 5/2016 | Nammi | | H04W 72/1231 370/329 |
| 2016/0219450 A1* | 7/2016 | Wakabayashi | | H04L 5/0053 |
| 2016/0270028 A1* | 9/2016 | Lee | | H04W 68/02 |
| 2016/0302221 A1* | 10/2016 | Wang | | H04W 72/1236 |
| 2016/0353371 A1* | 12/2016 | Zhang | | H04W 48/20 |
| 2016/0365944 A1* | 12/2016 | Blankenship | | H04L 1/0026 |
| 2017/0019163 A1* | 1/2017 | Yoshimoto | | H04L 1/00 |
| 2017/0094688 A1* | 3/2017 | Lee | | H04W 74/0833 |
| 2017/0134879 A1* | 5/2017 | Wong | | H04W 72/12 |
| 2017/0303248 A1* | 10/2017 | Chatterjee | | H04L 1/189 |
| 2017/0311284 A1* | 10/2017 | Basu Mallick | | H04W 68/02 |
| 2017/0311286 A1* | 10/2017 | Yi | | H04W 4/70 |
| 2017/0311290 A1* | 10/2017 | Adjakple | | H04W 76/18 |
| 2017/0332359 A1* | 11/2017 | Tsai | | H04B 7/0617 |
| 2017/0374689 A1* | 12/2017 | Liu | | H04W 72/042 |
| 2018/0014143 A1* | 1/2018 | Rico Alvarino | | H04W 4/70 |
| 2018/0070282 A1* | 3/2018 | Su | | H04W 36/32 |
| 2018/0115943 A1* | 4/2018 | Park | | H04W 68/00 |
| 2018/0131428 A1* | 5/2018 | Chen | | H04L 1/00 |
| 2018/0212739 A1* | 7/2018 | Kim | | H04B 7/06 |
| 2018/0227833 A1* | 8/2018 | Belleschi | | H04W 48/12 |

FOREIGN PATENT DOCUMENTS

| | | | | |
|---|---|---|---|---|
| CN | 102111808 | | 6/2011 | |
| CN | 102595516 A | | 7/2012 | |
| CN | 102598768 A | * | 7/2012 | ......... H04L 1/0003 |
| CN | 102625374 A | | 8/2012 | |
| CN | 102724051 A | | 10/2012 | |
| CN | 103379552 A | * | 10/2013 | ......... H04W 72/00 |
| CN | 103379552 B | * | 10/2016 | ......... H04W 72/00 |
| EP | 2244392 A2 | | 10/2010 | |
| EP | 2480023 A1 | * | 7/2012 | ......... H04L 1/0003 |
| EP | 2869491 A1 | * | 5/2015 | ......... H04L 5/003 |
| JP | 2011-508539 | | 3/2011 | |
| JP | 5031009 B2 | * | 9/2012 | ......... H04L 1/0003 |
| JP | 2015-532820 | | 11/2015 | |
| TW | 201412161 | | 3/2014 | |
| WO | WO-2011034021 A1 | * | 3/2011 | ......... H04L 1/0003 |
| WO | WO-2013073924 A1 | * | 5/2013 | ......... H04W 4/70 |
| WO | WO-2013159577 A1 | * | 10/2013 | ......... H04W 72/00 |
| WO | 2014/039260 | | 3/2014 | |

OTHER PUBLICATIONS

3GPP, 3GPP TS 36.331, Radio Resource Control (RRC), Protocol Specification, Mar. 19, 2014, Release 11, Version 11.7.0 (Year: 2014).*
3GPP, 3GPP TS 36.331, Radio Resource Control (RRC), Protocol Specification, Mar. 19, 2014, Release 12, Version 12.1.0 (Year: 2014).*
Ericsson et al., Tdoc: R1-133419, Low Complexity MTC UE, Aug. 23, 2013, 3GPP, 3GPP TSG-RAN WG1 Meeting #74 (Year: 2013).*
MediaTek Inc., Impact of Introducing Low-Cost MTC UE on RAN2, 3GPP TSG-RAN WG2#84 R2-134076, Nov. 15, 2013.

(56) References Cited

OTHER PUBLICATIONS

Huawei, HiSilicon, RAN2 impacts of Low Cost MTC, 3GPP TSG-RAN WG2#85 R2-140277, Feb. 14, 2014.
Ericsson, Capabilities of low cost/complexity MTC Ues, 3GPP TSG-RAN WG2#84 R2-134299, Nov. 15, 2013.
Alcatel-Lucent, Alcatel-Lucent Shanghai Bell, Considerations for low cost MTC UE, 3GPP TSG-RAN WG1#76b R1-141243, Mar. 22, 2014, http://www.3gpp.org/ftp/tsg_ran/WG1_RL1/TSGR1_76b/Docs/R1-141243.zip.
ZTE, "Remaining details of new UE category for low cost MTC", 3GPP TSG RAN WG1 Meeting #74bis, San Francisco, USA, Nov. 11-15, 2013, R1-135356.
Alcatel-Lucent, "Considerations for low cost MTC UE", 3GPP TSG-RAN WG1 Meeting #76bis, Shenzhen, China, Mar. 31-Apr. 4, 2014, R1-141243.
Huawei, HiSilicon, "RAN2 impacts of Low Cost MTC", 3GPP TSG-RAN WG2 #84, San Francisco, US Nov. 11-15, 2013, R2-133917.
Ericsson, "Overview of Issues for low cost & enhanced coverage MTC UE for LTE", 3GPP TSG-RAN WG4 Meeting #68bis, Riga, Latvia Oct. 7-11, 2013, R4-135314.
Alcatel-Lucent, "Considerations on low cost MTC in legacy network", 3GPP TSG RAN WG1 Meeting #86, Seoul, Korea, May 19-23, 2014, R1-142581.
International Search Report for PCT/CN2014/073910 dated Dec. 24, 2014.
Ericsson, "Transport Block Size limitation for low cost MTC UEs", 3GPP TSG-RAN WG2 #85, Prague, Czech Republic, Feb. 10-14, 2014, Tdoc R2-140673.

\* cited by examiner

METHOD AND APPARATUS FOR LOW COST MACHINE TYPE COMMUNICATION

TECHNICAL FIELD

The non-limiting and exemplary embodiments of the present disclosure herein relate to a wireless communication field. In particular, the embodiments herein relate to methods and apparatuses for low cost machine type communication.

BACKGROUND

A machine type communication ("MTC") apparatus or device is a user equipment ("UE") that is used by a machine for some specific applications. One example of such an MTC device is a smart utility meter. It is expected that such device would be delay tolerant and does not require high throughput. Therefore, in the third Generation Partnership Project ("3GPP"), a new work item for Low Cost MTC UE and coverage enhancement has been approved. Some characteristics of the Low Cost MTC ("LC-MTC") UE are as follows:

1 receiver ("Rx") antenna;
Maximum uplink and downlink transmission block size ("TBS") for unicast (data) of 1000 bits; and
A reduced bandwidth of 6 physical resource blocks ("PRBs"),
wherein the reduced bandwidth restriction is currently being debated in the 3GPP.

Since the LC-MTC UE, as indicated above, is only capable of supporting 1000 bits of traffic, a base station ("BS"), which may also be referred to as an evolved Node B ("eNB"), needs to be aware of the UE's limitations, i.e., recognizes and supports communication with the LC-MTC UE. This would limit the deployment of LC-MTC UEs only to those cells that support them. In other words, the LC-MTC UEs may not be well supported by legacy BSs. Such limitation may make it difficult to achieve economy of scale for the LC-MTC UEs and thereby difficult to obtain low cost benefits.

Therefore, there is a need in the art for a solution that allows such LC-MTC UEs with the TBS restriction to efficiently and effectively operate in the coverage area of the legacy BSs or eNBs.

SUMMARY

It is an object of the present disclosure to address the problems outlined above, and to provide a solution to allow the low cost machine type communication user equipment with the transmission block size restriction to operate in the coverage area of the legacy base station. This object may be obtained by providing methods and apparatuses as follows.

According to an aspect of the present disclosure, there is provided a method for use in a low cost machine type communication user equipment, wherein the low cost machine type communication user equipment communicates with a legacy base station. The method comprises adjusting at least one parameter relating to scheduling such that the legacy base station is to schedule the low cost machine type communication user equipment with a transmission block size less than a predefined size. The method also comprises reporting the adjusted at least one parameter to the legacy base station.

In one embodiment, the predefined size is a size of 1000 bits.

In another embodiment, the at least one parameter is a channel quality indicator and the adjusting comprises dynamically adjusting a value of the channel quality indicator according to a maximum value, wherein the maximum value is adapted based on whether the legacy base station has scheduled the low cost machine type communication user equipment with the transmission block size greater than the predefined size or less than the predefined size.

In an additional embodiment, the at least one parameter is a buffer size value in a buffer status report and the adjusting comprises adjusting the buffer size value such that the buffer size value is not greater than a predefined maximum value.

In a further embodiment, the at least one parameter is a power headroom value and the adjusting the power headroom value according to a reference signal received power measurement such that the legacy base station is to schedule physical uplink sharing channel resources that lead to the transmission block size less than the predefined size.

In the above embodiments, the method further comprises reporting capability category one to the legacy base station if an indication of whether the legacy base station supports communication with the low cost machine type communication user equipment has not been received.

According to another aspect of the disclosure, there is provided an apparatus for use in a low cost machine type communication user equipment, wherein the low cost machine type communication user equipment communicates with a legacy base station. The apparatus comprises an adjusting unit configured to adjust at least one parameter relating to scheduling such that the legacy base station is to schedule the low cost machine type communication user equipment with a transmission block size less than a predefined size. The apparatus also comprises a reporting unit configured to report the adjusted at least one parameter to the legacy base station.

According to an aspect of the present disclosure, there is provided an apparatus for use in a low cost machine type communication user equipment, wherein the low cost machine type communication user equipment communicates with a legacy base station. The apparatus comprises at least one processor and at least one memory including computer program code, wherein the at least one memory and the computer program code are configured to, with the at least one processor, cause the apparatus at least to adjust at least one parameter relating to scheduling such that the legacy base station is to schedule the low cost machine type communication user equipment with a transmission block size less than a predefined size. The at least one memory and the computer program code are also configured to, with the at least one processor, cause the apparatus at least to report the adjusted at least one parameter to the legacy base station.

By means of solutions discussed in the various aspects and embodiments as mentioned above, the low cost machine type communication user equipment with transmission block size restrictions is able to operate in the coverage area of the legacy base station. Therefore, it is possible to deploy the low cost machine type communication user equipments to a variety of cells such as those provided by the legacy base station. Thereby, it would be easy to achieve economy of scale for low cost machine type communication user equipments and reduce the communication cost associated therewith.

BRIEF DESCRIPTION OF THE DRAWINGS

Embodiments will now be described in more detail in relation to the enclosed drawings, in which.

DETAILED DESCRIPTION

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

The basic idea of the present disclosure is to adjust (or scale) the LC-MTC UE reported parameters related to scheduling to the base station or eNB such that the legacy base station or eNB would not schedule a TBS larger than 1000 bits. This adjusting is dynamic and would be adaptive to the different base station or eNB schedulers.

Figure 1:
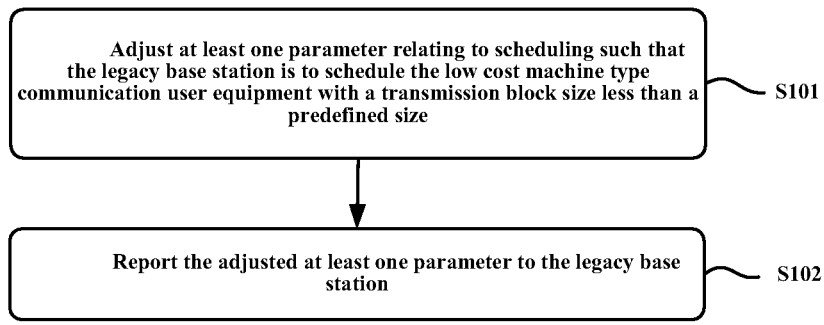
FIG. 1 is a schematic flowchart of a method for use in an LC-MTC UE according to embodiments of the present disclosure.

FIG. 1 is a schematic flowchart of a method 100 for use in an LC-MTC UE according to embodiments of the present disclosure. As illustrated in FIG. 1, at S101, the method 100 adjusts at least one parameter relating to scheduling such that the legacy base station is to schedule the LC-MTC UE with a TBS less than a predefined size. In one embodiment, the predefined size is a size of 1000 bits, that is, the LC-MTC UE TBS restriction as mentioned before. Then, at S102, the method 100 reports the adjusted at least one parameter to the legacy base station.

In an example embodiment, the at least one parameter is a CQI. In a further example embodiment, the adjusting at S101 comprises dynamically adjusting a value of the CQI according to a maximum value, wherein the maximum value is adapted based on whether the legacy base station has scheduled the LC-MTC UE with the TBS greater than the predefined size or less than the predefined size, as will be discussed in detail in reference to FIG. 2.

In particular, for the downlink, the dynamic adjusting at S101 may be performed on the LC-MTC UE's reported CQI. Because the CQI is an indication of the LC-MTC UE's radio condition, most eNB schedulers may use the CQIs to determine the modulation and coding schemes ("MCSs") and thereby select proper TBSs for the LC-MTC UEs.

According to embodiments of the present disclosure, a maximum CQI, denoted as $CQI_{MAX}$, may be imposed such that the reported CQI cannot exceed this $CQI_{MAX}$. The $CQI_{MAX}$ herein may not be constant but dynamically adapted. For instance, the LC-MTC UE may proceed with a low $CQI_{MAX}$ and slowly increase the $CQI_{MAX}$ to either its actual measured CQI value or to a value leading to TBS being greater than 1000 bits. Whenever the TBS is greater than 1000 bits, the LC-MTC UE may reduce $CQI_{MAX}$ by a certain value (for example, one predefined step size). Additionally or alternatively, the LC-MTC UE may begin with setting $CQI_{MAX}$=actual measured CQI value and then reduce its $CQI_{MAX}$ until the legacy base station allocates a TBS less than 1000 bits.

In an example embodiment, the at least one parameter is a buffer size value in a buffer status report. In a further example embodiment, the adjusting at S101 comprises adjusting the buffer size value such that the buffer size value is not greater than a predefined maximum value.

In particular, for the uplink, the dynamic adjusting at S101 is performed on a buffer size value in a buffer status report (BSR). For example, the LC-MTC UE may impose a maximum limit on the buffer size value such that the legacy base station does not allocate physical uplink sharing channel ("PUSCH") resource(s) that lead to a TBS being greater than 1000 bits. For example, the reported buffer size value could be selected each time by the LC-MTC UE from a less one of the number of data bits currently in the buffer and 1000 bits.

In another example embodiment, the at least one parameter is a power headroom value. In a further example embodiment, the adjusting at S101 comprises adjusting the power headroom value according to a reference signal received power measurement such that the legacy base station is to schedule physical uplink sharing channel resources that lead to the TBS less than the predefined size. For example, if the scheduled TBS larger than 1000 bits, then the LC-MTC UE may report a negative power headroom value to the legacy base station.

In an example embodiment, the method 100 further reports capability category one to the legacy base station if an indication of whether the legacy base station supports communication with the LC-MTC UE has not been received. In other words, when the LC-MTC UE does not receive an indication that the cell supports the LC MTC, they may report their respective capability categories of category one to the legacy base station. Thereby, the legacy base station can recognize this type of UE and may not use spatial multiplexing and may apply the aforementioned dynamic adjusting.

By virtue of the method 100 and its several variants or improvements as set forth in the above embodiments, the TBS restrictions associated with the LC-MTC UE could be eliminated, making it possible for the LC-MTC UE to operate in the coverage area of the legacy base station.

Figure 2:
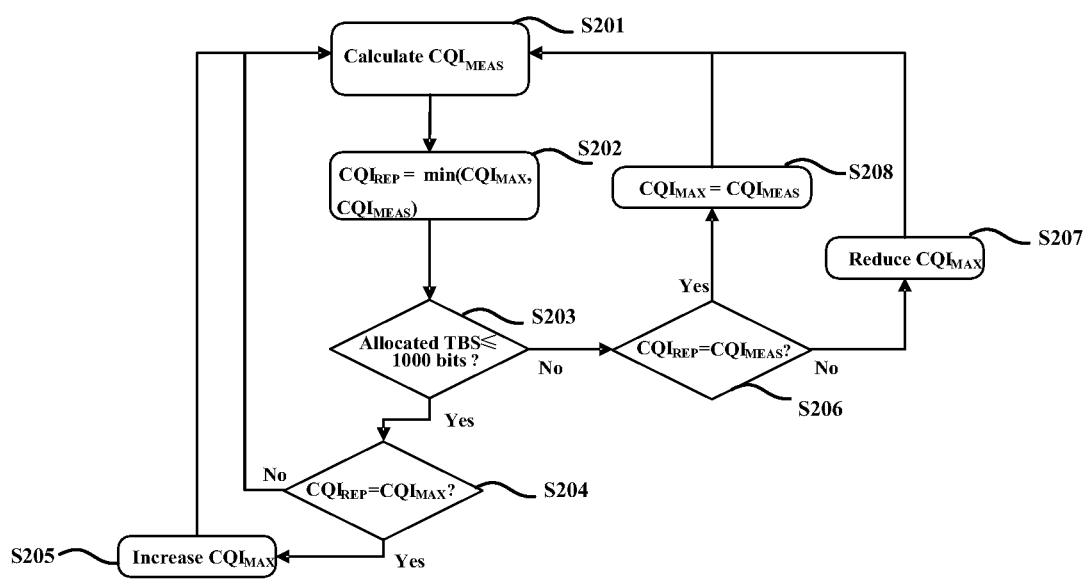
FIG. 2 is a schematic flowchart of a method for use in an LC-MTC UE according to an embodiment of the present disclosure.

FIG. 2 is a schematic flowchart of a method 200 for use in an LC-MTC UE according to an embodiment of the present disclosure. In particular, FIG. 2 illustrates a potential CQI adjusting approach where a maximum CQI is adapted based on the base station scheduling. For simplification, the maximum CQI is denoted as $CQI_{MAX}$, the measured CQI is denoted as $CQI_{MEAS}$, and the reported CQI is denoted as $CQI_{REP}$.

As illustrated in FIG. 2, the method 200 begins at S201, at which, the method 200 calculates a CQI based on the channel measurements to obtain the $CQI_{MEAS}$. Then, at S202, the method 200 determines the $CQI_{REP}$ based on the following equation:

$$CQI_{REP}=\min(CQI_{MAX}, CQI_{MEAS}),$$

wherein min( ) means that $CQI_{REP}$ takes a less one of the $CQI_{MAX}$ and $CQI_{MEAS}$.

Although not depicted in FIG. 2, the LC-MTC UE may report the $CQI_{REP}$ to the legacy base station and then decode physical downlink control channel ("PDCCH") transmission to determine the allocated TBS from the legacy base station. Then, at S203, the method 200 determines whether the allocated TBS is less than or equal to 1000 bits. If this is the case, then flow advances to S204, at which it is further determined whether the $CQI_{MAX}$ is equal to $CQI_{REP}$. If the answer is "Yes," then at S205, the method 200 increases the $CQI_{MAX}$, e.g., by one step size, such as 1 CQI index. Otherwise, if the answer at S204 is "No," then the flow may loop back to S201 for a next round of reporting and adjusting.

If it is determined, at S203, that the allocated TBS is greater than 1000 bits, then the flow proceeds to S206, at which, it is further determined whether the $CQI_{REP}$ is equal to $CQI_{MEAS}$. If this is the case, then at S208, the method 200 lets the $CQI_{MAX}$ to take the value of the $CQI_{MEAS}$ and returns to S201. If this is not the case, then at S207, the method 200 reduces the $CQI_{MAX}$, e.g., by one step size, and then returns to S201.

From the above description made with reference to FIG. 2, it is to be understood that the reported CQI according to the present disclosure may be adjusted dynamically. Thereby, the reported CQI could be more accurate and thus the legacy base station could make more proper scheduling for the LT-MTC UE.

Figure 3:
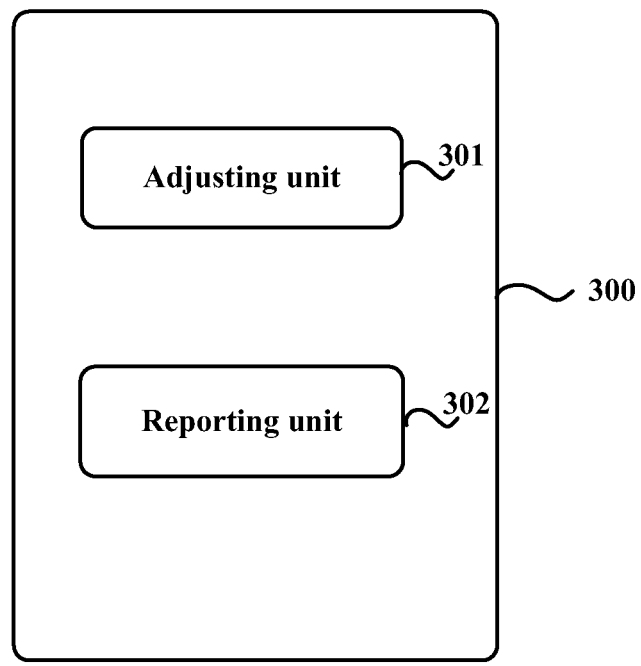
FIG. 3 is a schematic block diagram depicting an apparatus for use in an LC-MTC UE according to an embodiment of the present disclosure.

FIG. 3 is a schematic block diagram depicting an apparatus 300 for use in an LC-MTC UE according to an embodiment of the present disclosure. As illustrated in FIG. 3, the apparatus 300 comprises an adjusting unit 301 configured to adjust at least one parameter relating to scheduling such that the legacy base station is to schedule the LC-MTC UE with a TBS less than a predefined size. The apparatus 300 also comprises a reporting unit 302 configured to report the adjusted at least one parameter to the legacy base station.

In an example embodiment, the predefined size is a size of 1000 bits.

In another example embodiment, the at least one parameter is a channel quality indicator. In a further example embodiment, the adjusting unit 301 is configured to dynamically adjust a value of the channel quality indicator according to a maximum value, wherein the maximum value is adapted based on whether the legacy base station has scheduled the LC-MTC UE with the TBS greater than the predefined size or less than the predefined size.

In an example embodiment, the at least one parameter is a buffer size value in a buffer status report. In a further example embodiment, the adjusting unit 301 is configured to adjust the buffer size value such that the buffer size value is not greater than a predefined maximum value.

In an example embodiment, the at least one parameter is a power headroom value. In a further example embodiment, the adjusting unit 301 is configured to adjust the power headroom value according to a reference signal received power measurement such that the legacy base station is to schedule physical uplink sharing channel resources that lead to the TBS less than the predefined size.

In some example embodiments, the reporting unit 302 is configured to report capability category one to the legacy base station if an indication of whether the legacy base station supports communication with the LC-MTC UE has not been received.

From the above descriptions, it is to be understood that the apparatus 300 is capable of performing the methods 100 and 200 and their variants and extensions as discussed in relevant example embodiments as before. Further, the apparatus 300 may be embodied as an LC-MTC UE or a part thereof.

Figure 4:
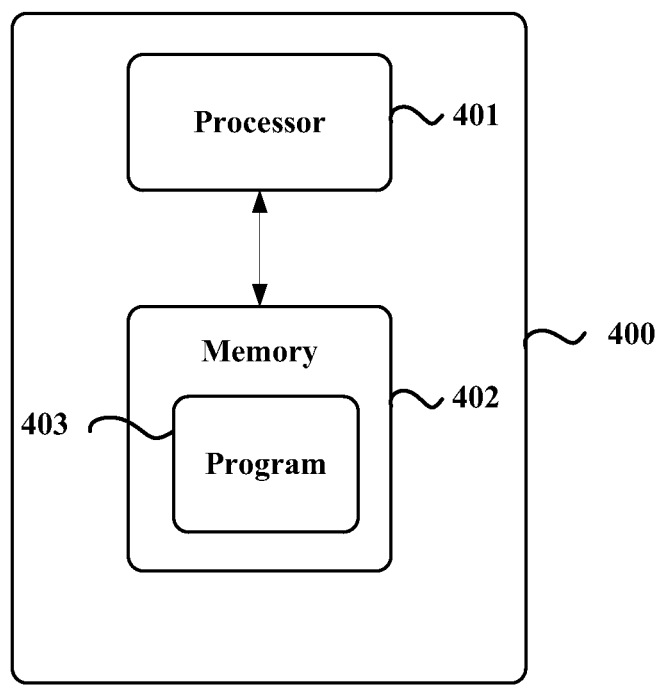
FIG. 4 is a schematic block diagram depicting an apparatus for use in an LC-MTC UE according to another embodiment of the present disclosure.

FIG. 4 is a schematic block diagram depicting an apparatus 400 for use in an LC-MTC UE according to another embodiment of the present disclosure. As illustrated in FIG. 4, the apparatus 400 includes at least one processor 401, such as a data processor, at least one memory (MEM) 402 coupled to the processor 401. Depending on different implementations, although not shown, the apparatus 400 may further include a suitable RF transmitter TX and receiver RX coupled to the processor 401 so as to establish wireless connections with other nodes in the wireless network, e.g., the legacy base station or eNB in the present disclosure. The MEM 402 stores a program (PROG) 403. A combination of the processor 401 and the memory 402 forms processing means adapted to perform the embodiments of the present disclosure. The apparatus 400 may be coupled via a data path to one or more external networks or systems, such as the internet, for example.

The PROG 403 is assumed to include instructions that, when executed by the processor 401, enable the apparatus 400 to operate in accordance with the exemplary embodiments of the present disclosure, as discussed herein with the methods 100, 200 and their respective variants and extensions as discussed in example embodiments of the present disclosure. Similar to the apparatus 300, it is to be understood that the apparatus 400 is also capable of performing the methods 100 and 200 and their variants and extensions as discussed in relevant example embodiments as before. Further, the apparatus 400 may be embodied as an LC-MTC UE or a part thereof.

In general, the embodiments of the present disclosure may be implemented by computer software executable by at least one processor 401 of the apparatus 400, or by hardware, or by a combination of software and hardware.

The MEM 402 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 400, there may be several physically distinct memory units in the apparatus 400. The processor 401 may be of any type suitable to the local technical environment, and may include one or more of general purpose computers, special purpose computers, microprocessors, digital signal processors (DSPs) and processors based on multicore processor architecture, as non limiting examples. The apparatus 400 may have multiple processors, such as for example an application specific integrated circuit chip that is slaved in time to a clock which synchronizes the main processor.

Further, according to different implementation manners, the present disclosure also provides a computer program, comprising instructions which, when executed on at least one processor, e.g., the processor 401, cause the at least one processor to carry out the methods according to the example embodiments of the present disclosure.

In addition, the present disclosure provides a carrier containing the computer program as mentioned above, wherein the carrier is one of an electronic signal, optical signal, radio signal, or computer readable storage medium.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (e.g., procedures, functions, and so on) that perform the functions described herein.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for use in a low cost machine type communication user equipment, wherein the low cost machine type communication user equipment communicates with a legacy base station, the apparatus comprising:
    an adjusting unit configured to adjust at least one parameter relating to scheduling to generate an adjusted at least one parameter such that the legacy base station is to schedule the low cost machine type communication user equipment with a transmission block size less than a predefined size; and
    a reporting unit configured to report the adjusted at least one parameter to the legacy base station;
    wherein the at least one parameter is a channel quality indicator;
    wherein the adjusting unit is configured to:
    determine whether the legacy base station has scheduled the low cost machine type communication user equipment with the transmission block size greater than the predefined size or less than the predefined size; and
    dynamically adjust a value of the channel quality indicator according to a maximum value, wherein the maximum value is adapted based on whether the legacy base station has scheduled the low cost machine type communication user equipment with the transmission block size greater than the predefined size or less than the predefined size.

2. The apparatus as recited in claim 1, wherein the predefined size is 1000 bits.

3. The apparatus as recited in claim 1, wherein the at least one parameter is a buffer size value in a buffer status report.

4. The apparatus as recited in claim 3, wherein the adjusting unit is configured to adjust the buffer size value such that the buffer size value is not greater than a predefined maximum value.

5. An apparatus for use in a low cost machine type communication user equipment, wherein the low cost machine type communication user equipment communicates with a legacy base station, the apparatus comprising:
    at least one processor;
    at least one memory including computer program code,
    wherein the at least one memory and the computer program code are configured to, with the at least one processor, cause the apparatus at least to:
    adjust at least one parameter relating to scheduling to generate an adjusted at least one parameter such that the legacy base station is to schedule the low cost machine type communication user equipment with a transmission block size less than a predefined size; and
    report the adjusted at least one parameter to the legacy base station;
    wherein the at least one parameter is a channel quality indicator;
    wherein said at least one processor is configured to execute said computer-readable instructions to cause said apparatus to:
    determine whether the legacy base station has scheduled the low cost machine type communication user equipment with the transmission block size greater than the predefined size or less than the predefined size; and
    wherein the adjustment of the at least one parameter comprises:
    dynamically adjusting a value of the channel quality indicator according to a maximum value, wherein the maximum value is adapted based on whether the legacy base station has scheduled the low cost machine type communication user equipment with the transmission block size greater than the predefined size or less than the predefined size.

6. A method for use in a low cost machine type communication user equipment, wherein the low cost machine type communication user equipment communicates with a legacy base station, the method comprising:
    adjusting at least one parameter relating to scheduling to generate an adjusted at least one parameter such that the legacy base station is to schedule the low cost machine type communication user equipment with a transmission block size less than a predefined size; and
    reporting the adjusted at least one parameter to the legacy base station;
    wherein the at least one parameter is a channel quality indicator;
    wherein the method further comprises:
    determining whether the legacy base station has scheduled the low cost machine type communication user equipment with the transmission block size greater than the predefined size or less than the predefined size; and
    wherein the adjusting comprises:
    dynamically adjusting a value of the channel quality indicator according to a maximum value, wherein the maximum value is adapted based on whether the legacy base station has scheduled the low cost machine type communication user equipment with the transmission block size greater than the predefined size or less than the predefined size.

7. The method as recited in claim 6, wherein the predefined size is 1000 bits.

8. The method as recited in claim 6, wherein the at least one parameter is a buffer size value in a buffer status report.

9. The method as recited in claim 8, wherein the adjusting comprises:
    adjusting the buffer size value such that the buffer size value is not greater than a predefined maximum value.

10. A method for use in a low cost machine type communication user equipment, wherein the low cost machine type communication user equipment communicates with a legacy base station, the method comprising:

adjusting at least one parameter relating to scheduling to generate an adjusted at least one parameter such that the legacy base station is to schedule the low cost machine type communication user equipment with a transmission block size less than a predefined size; and reporting the adjusted at least one parameter to the legacy base station;

wherein the at least one parameter is a power headroom value; and wherein the adjusting comprises:

adjusting the power headroom value according to a reference signal received power measurement such that the legacy base station is to schedule physical uplink sharing channel resources that lead to the transmission block size less than the predefined size.

11. The method as recited in claim 6, further comprising:

reporting capability category one to the legacy base station in response to that an indication of whether the legacy base station supports communication with the low cost machine type communication user equipment has not been received.

12. An apparatus for use in a low cost machine type communication user equipment, wherein the low cost machine type communication user equipment communicates with a legacy base station, the apparatus comprising:

an adjusting unit configured to adjust at least one parameter relating to scheduling to generate an adjusted at least one parameter such that the legacy base station is to schedule the low cost machine type communication user equipment with a transmission block size less than a predefined size; and a reporting unit configured to report the adjusted at least one parameter to the legacy base station;

wherein the at least one parameter is a power headroom value; and wherein the adjusting unit is configured to adjust the power headroom value according to a reference signal received power measurement such that the legacy base station is to schedule physical uplink sharing channel resources that lead to the transmission block size less than the predefined size.

13. The apparatus as recited in claim 1, wherein the reporting unit is configured to report capability category one to the legacy base station if an indication of whether the legacy base station supports communication with the low cost machine type communication user equipment has not been received.

\* \* \* \* \*